US008393770B2

(12) United States Patent
Agata et al.

(10) Patent No.: US 8,393,770 B2
(45) Date of Patent: Mar. 12, 2013

(54) LIGHTING DEVICE (75) Inventors: Kazuki Agata, Shizuoka (JP); Satoru Yashiki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 224 days.

(21) Appl. No.: 12/936,461

(22) PCT Filed: Apr. 14, 2009

(86) PCT No.: PCT/JP2009/057521
§ 371 (c)(1),
(2), (4) Date: Oct. 5, 2010

(87) PCT Pub. No.: WO2009/128452
PCT Pub. Date: Oct. 22, 2009

(65) Prior Publication Data
US 2011/0026267 A1    Feb. 3, 2011

(30) Foreign Application Priority Data

Apr. 14, 2008    (JP) .................................. 2008-105020

(51) Int. Cl.
*B60Q 1/04* (2006.01)
(52) U.S. Cl. .......... 362/546; 315/82; 174/72 A; 439/701
(58) Field of Classification Search .................. 362/362, 362/459, 507, 546–547, 538, 475, 476; 315/77, 315/82; 174/72 A; 439/701, 34–36
See application file for complete search history.

(56) References Cited

U.S. PATENT DOCUMENTS
6,201,350 B1    3/2001    Okuchi et al.

FOREIGN PATENT DOCUMENTS

| CN | 1321349 A | 7/2001 |
|---|---|---|
| EP | 1003356 A2 | 5/2000 |
| JP | 54-53687 | 4/1979 |
| JP | 11-191442 | 7/1999 |
| JP | 2000-12151 | 1/2000 |
| JP | 2000-156294 | 6/2000 |
| JP | 2004-171916 | 6/2004 |

OTHER PUBLICATIONS

State Intellectual Property Office of China, Office Action for Chinese Patent Application No. 200980113211.3 (dated Oct. 10, 2012) with English translation.

*Primary Examiner* — Mariceli Santiago
*Assistant Examiner* — Donald Raleigh
(74) *Attorney, Agent, or Firm* — Fish & Richardson P.C.

(57) ABSTRACT

A lighting device comprises a power circuit unit 23 that includes a plurality of power terminals 25 supplied with power from a power source, a plurality of harnesses 29 that supply power supplied to the power circuit unit to a discharge lamp, a terminal housing 43 that is made of a resin material, and includes a harness holding portion 48, one ends of the plurality of harnesses being disposed in the harness holding portion and a part of the plurality of harnesses being held in the harness holding portion, and a plurality of welding terminals 28 that includes portions disposed in the terminal housing and portions protruding outward from the terminal housing. One end portions of the plurality of welding terminals are connected to one end portions of the electric wires of the harnesses, respectively, and the other end portions of the plurality of welding terminals are connected to the power terminals of the power circuit unit by welding, respectively. Accordingly, the workability of a connecting piece for connection with a power circuit unit is improved and good connection of harnesses can be secured.

5 Claims, 6 Drawing Sheets

LIGHTING DEVICE

TECHNICAL FIELD

The present disclosure relates to a lighting device that is preferably used for a discharge lamp. More particularly, the present disclosure relates to the field of a technique that improves the workability of a connecting piece for connection with a power circuit unit by providing a terminal housing that holds a plurality of harnesses connected to a plurality of welding terminals.

BACKGROUND ART

A vehicle headlight includes a discharge lamp provided as a light source and a lighting device for lighting the discharge lamp. The discharge lamp and the lighting device are disposed in a lamp chamber that is formed by a front cover and a lamp body.

This lighting device includes a power circuit unit that supplies power to a bulb socket on which a discharge lamp is mounted or a so-called starter used as a starting unit of the discharge lamp. The power circuit unit is connected to the bulb socket or the starter by a harness functioning as a connecting wire.

If multiple harnesses are used as the connecting wire, one end portions of the respective harnesses are connected to power terminals of the power circuit unit by a method, such as welding or soldering, respectively (for example, see Patent Document 1).

RELATED ART DOCUMENT

Patent Document

[Patent Document 1] JP-A-2000-156294

DISCLOSURE OF THE INVENTION

Problem that the Invention is to Solve

However, in the lighting device disclosed in Patent Document 1, as described above, one end portions of the harnesses are connected to the power terminals of the power circuit unit by welding or soldering, respectively. For this reason, the same connection operation needs to be repeated for every harness. Therefore, since many human hours also are required for the connection operation, there is a problem in that the working hours are increased.

Further, when vibration is generated at the discharge lamp or the lighting device while the vehicle is traveling or the like, there is a concern that the generated vibration will be transmitted to the harnesses and result in poor connection of the harnesses.

Accordingly, objects of a lighting device according to the disclosure are to improve the workability of a connecting piece for connection with a power circuit unit and to secure good connection of harnesses.

Means for Solving the Problem

In order to solve the above mentioned problem, a lighting device comprises a power circuit unit that includes a plurality of power terminals supplied with power from a power source; a plurality of harnesses that include electric wires through which power supplied to the power circuit unit is supplied to a discharge lamp and nonconductive coating portions that cover portions of the electric wires other than both ends of the electric wires; a terminal housing that is made of a resin material, and includes a harness holding portion, one ends of the plurality of harnesses being disposed in the harness holding portion and a part of the plurality of harnesses being held in the harness holding portion; and a plurality of welding terminals that includes portions disposed in the terminal housing and portions protruding outward from the terminal housing, wherein one end portions of the plurality of welding terminals are connected to one end portions of the electric wires of the harnesses, respectively, and the other end portions of the plurality of welding terminals are connected to the power terminals of the power circuit unit by welding, respectively.

Accordingly, in the lighting device, a part of the plurality of harnesses is held by the harness holding portion of the terminal housing and the plurality of welding terminals, which protrude from the terminal housing, are welded to the respective power terminals.

Advantage of the Invention

A lighting device according to one aspect of the present invention includes a power circuit unit and a plurality of harnesses, the power circuit unit including a plurality of power terminals supplied with power from a power source, and the plurality of harnesses including electric wires through which power supplied to the power circuit unit is supplied to a discharge lamp and nonconductive coating portions that cover portions of the electric wires other than both ends of the electric wires, the lighting device comprising:

a terminal housing that is made of a resin material, and includes a harness holding portion, one ends of the plurality of harnesses being disposed in the harness holding portion and a part of the plurality of harnesses being held in the harness holding portion; and a plurality of welding terminals that includes portions disposed in the terminal housing and portions protruding outward from the terminal housing, wherein one end portions of the plurality of welding terminals are connected to one end portions of the electric wires of the harnesses, respectively, and the other end portions of the plurality of welding terminals are connected to the power terminals of the power circuit unit by welding, respectively.

Accordingly, it can be possible to perform simultaneously or continuously a welding operation for welding the welding terminals to the power terminals, and to improve the workability of the welding piece.

Further, a part of the harnesses are held by the harness holding portion. Accordingly, when vibration is generated at each component such as the discharge lamp, the harnesses are hardly moved from the welding terminals. As a result, it can be possible to prevent poor connection between the harnesses and the welding terminals.

In another aspect, the terminal housing includes a horizontal portion that holds the harnesses so that the harnesses extend in a horizontal direction, and an inclined portion that holds the harnesses so that the harnesses are inclined with respect to the horizontal direction, the inclined portion is disposed closer to the discharge lamp than the horizontal portion, and the harnesses protrude obliquely downward from the inclined portion. Therefore, it can be possible to prevent interference between the discharge lamp and the harnesses without contact between the discharge lamp and the harnesses.

In a further aspect, the terminal housing includes a terminal holding portion that is positioned between the harness holding portion and the other end portions of the welding terminals and clamps and holds the welding terminals. Therefore, it can be possible to secure stable connection between the harnesses and the welding terminals.

In another aspect, the power circuit unit is provided on a back cover of a vehicle headlight, and the vehicle headlight includes a lamp body including a mounting portion that includes a mounting opening at a rear end portion thereof, a front cover that covers a front surface of the lamp body, and the back cover that is mounted on the mounting portion of the lamp body. Therefore, an exclusive disposition space for the power circuit unit is not needed, and it can be possible to reduce the size of the lighting device by the effective use of a disposition space.

In yet another aspect, a mounting recess where the terminal housing is inserted and mounted is formed at the back cover, a cover-side positioning portion is formed at an opening edge of the mounting recess of the back cover, and a housing-side positioning portion, which is positioned at the cover-side positioning portion, is formed at an outer peripheral portion of the terminal housing. Therefore, it can be possible to easily position the terminal housing relative to the back cover, and the workability of a mounting work for mounting the terminal housing on the back cover is improved.

BEST MODE FOR CARRYING OUT THE INVENTION

A lighting device according to an embodiment of the invention is described below with reference to the accompanying drawings. The lighting device is used to light a discharge lamp, and forms a part of a vehicle headlight.

Vehicle headlights 1 are disposed and mounted on both left and right end portions of a front end portion of a vehicle body.

Figure 1:
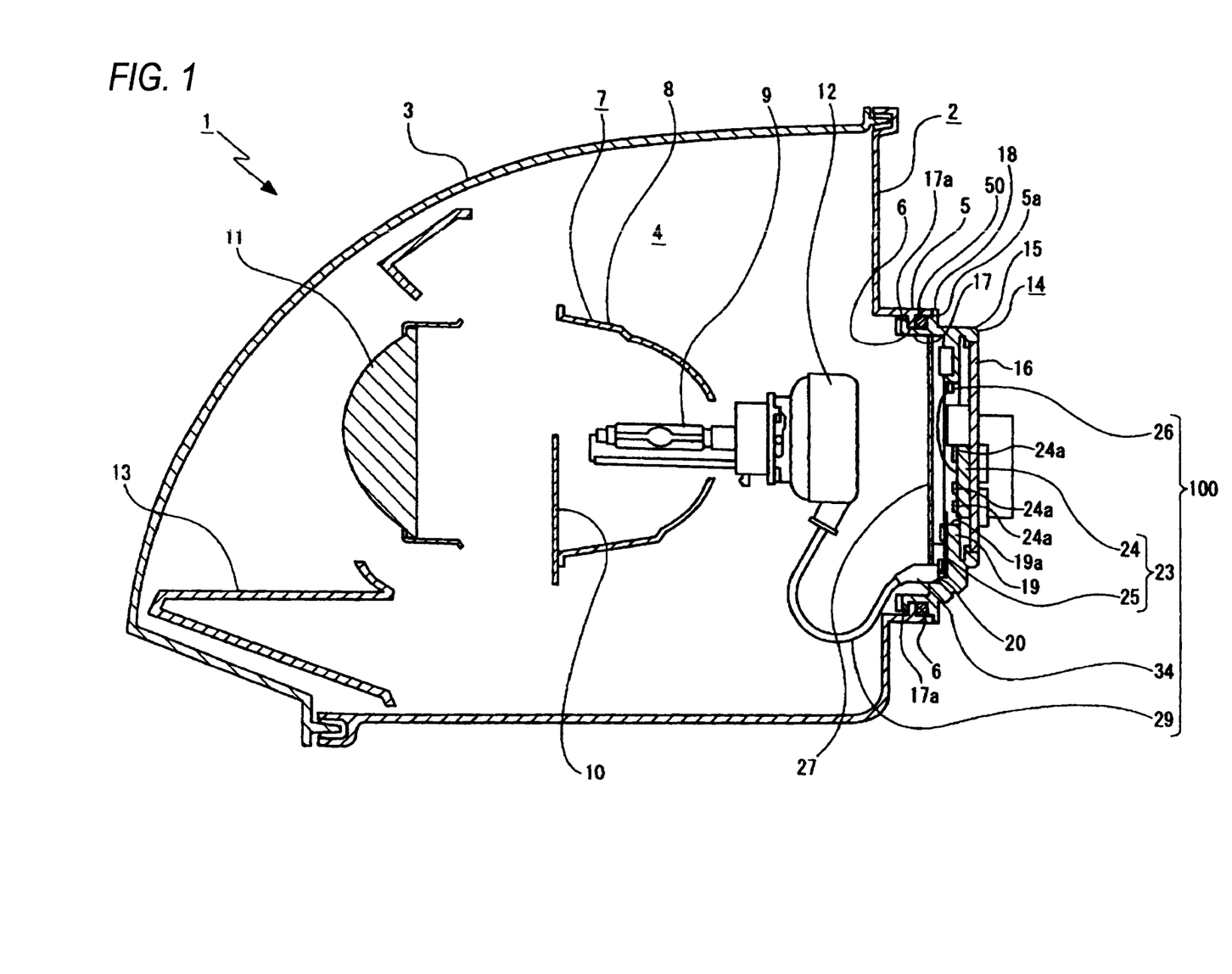
FIG. 1 shows an example of a lighting device of the present invention together with FIGS. 2 to 6, and is a schematic longitudinal sectional view of a vehicle headlight to which the lighting device is provided.

As shown in FIG. 1, the vehicle headlight 1 includes a lamp body 2 and a front cover 3. The lamp body 2 includes a recess that is opened toward the front side, and the front cover 3 closes the front opening of the lamp body 2. An inner space, which is formed by the lamp body 2 and the front cover 3, is formed as a lamp chamber 4.

A mounting portion 5, which is formed in a substantially cylindrical shape, is formed at a rear end portion of the lamp body 2. The mounting portion 5 includes a mounting opening 5a that passes through the mounting portion in a front-rear direction. Engaging portions 6, 6, . . . are formed on an inner surface of the mounting portion 5. The engaging portions 6, 6, . . . are formed at intervals in a circumferential direction, and protrude inward from an inner surface of the mounting portion 5 so as to extend in the circumferential direction.

A lamp unit 7 is disposed in the lamp chamber 4. The lamp unit 7 includes a reflector 8, a discharge lamp 9 supported by the reflector 8, a shade 10 mounted on the reflector 8, and a projection lens 11 disposed on the front side of the discharge lamp 9.

The lamp unit 7 can be swiveled by a swivel mechanism (not shown). Accordingly, the lamp unit is swiveled in a horizontal direction so that light, which is emitted from the discharge lamp 9 and projected forward through the projection lens 11, follows the traveling direction of the vehicle.

A socket 12 is mounted to a rear end portion of the discharge lamp 9, and a starter (not shown) is disposed in the socket 12.

An extension 13 for closing a part of the lamp unit 7 is disposed in the lamp chamber 4.

A back cover 14 for closing the mounting opening 5a is mounted on the mounting portion 5 of the lamp body 2. The back cover 14 includes a main body 15 and a heat radiating body 16 mounted on the main body 15.

Figure 2:
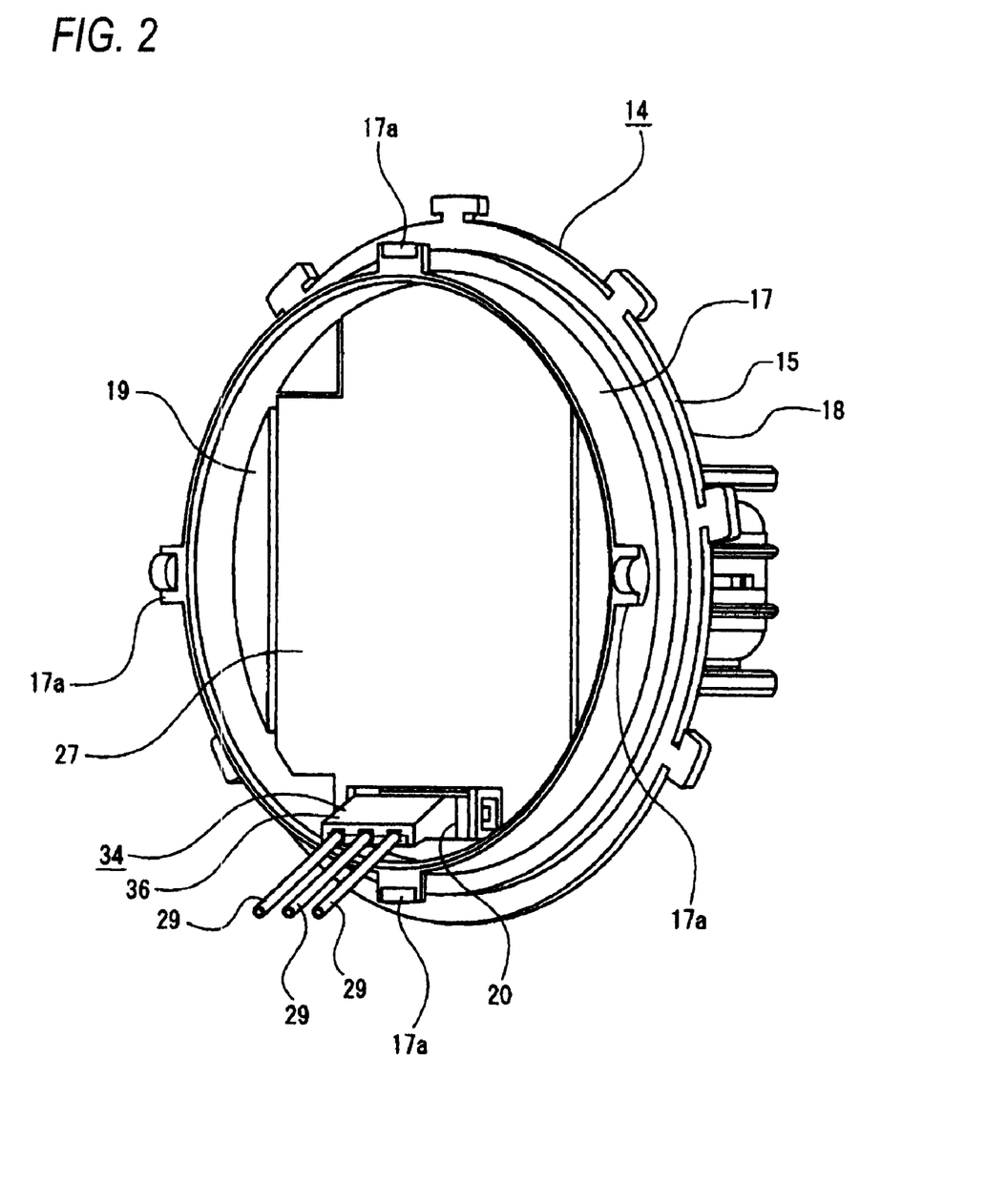
FIG. 2 is an enlarged perspective view showing a back cover.

As shown in FIGS. 1 and 2, the main body 15 includes a mounted portion 17 that is formed in a substantially ring shape, a flange portion 18 that protrudes outward from a rear end portion of the mounted portion 17, and an internal structural portion 19 that is provided inside the flange portion 18. In this embodiment, it is preferable that the main body 15 be made of a resin material.

Engaging protrusions 17a, 17a, . . . , which protrude outward, are formed at a front end portion of the mounted portion 17 at intervals in a circumferential direction.

A disposition hole 19a, which passes through the internal structural portion in the front-rear direction, is formed at the internal structural portion 19.

Figure 3:
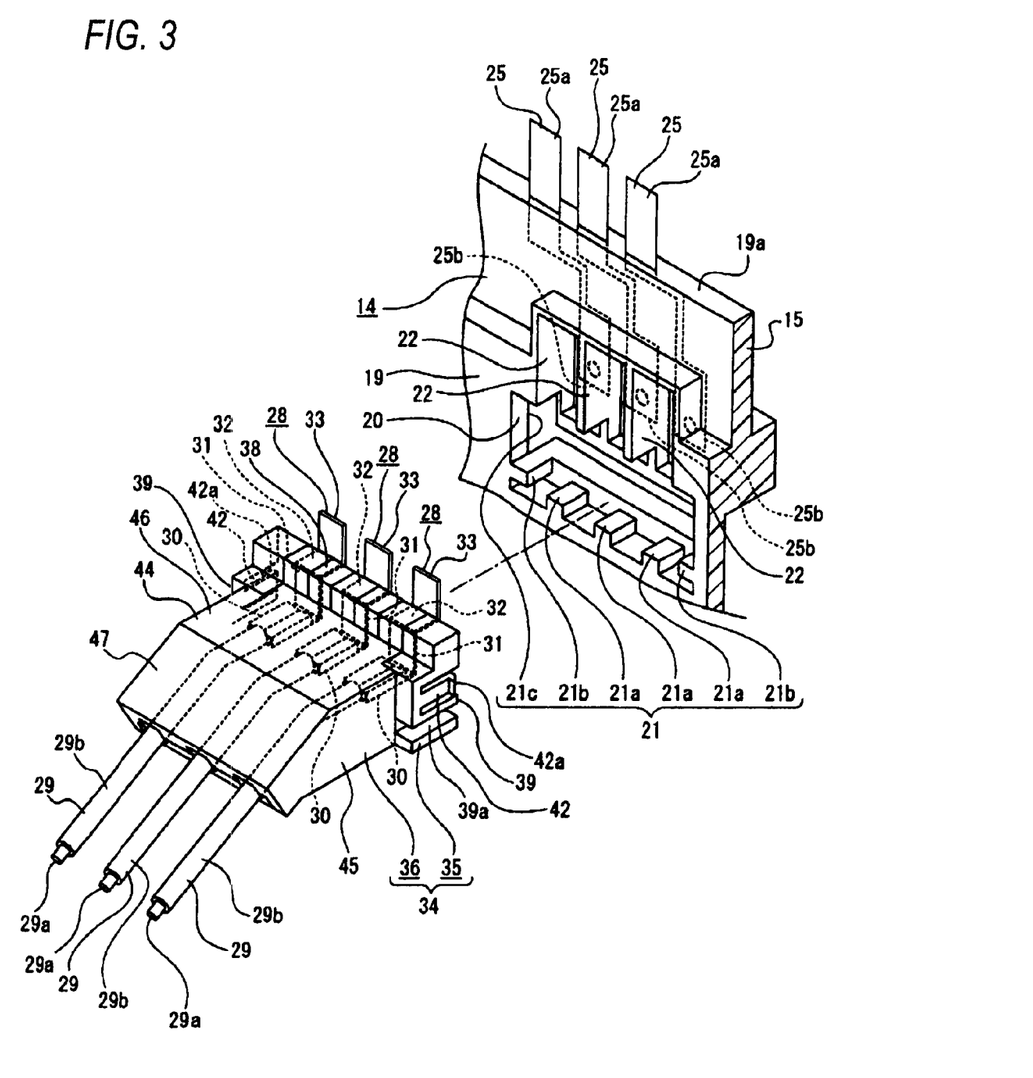
FIG. 3 is an enlarged exploded perspective view showing a terminal housing, the back cover to which the terminal housing is attached.

A mounting recess 20, of which a front portion is opened in a substantially rectangular shape, is formed on the front surface of the internal structural portion 19. A cover-side positioning portion 21 is formed at an opening edge of the mounting recess 20 (see FIG. 3). The cover-side positioning portion 21 includes first protrusions 21a, 21a, and 21a that are formed at a lower opening edge of the mounting recess 20; second protrusions 21b and 21b that are formed at left and right opening edges of the mounting recess 20, respectively; and engaging edges 21c and 21c (of which only one is shown in FIG. 3) that are formed at the left and right opening edges of the mounting recess 20, respectively.

The first protrusions 21a, 21a, and 21a are formed at regular intervals in a left-right direction. The second protrusions 21b and 21b are formed near a lower end of the mounting recess 20 so as to protrude in a direction where the second protrusions approach each other. Each of the engaging edges 21c and 21c is an edge that is formed by a side surface of the mounting recess 20 and a rear surface of the internal structural portion 19 continued to the side surface.

Three disposition recesses 22, 22, and 22 are formed at the internal structural portion 19. The disposition recesses 22, 22, and 22 are opened forward and downward, and are positioned at regular intervals in the left-right direction. The disposition recesses 22, 22, and 22 form recesses that are continued to the mounting recess 20 through lower openings.

The vehicle headlight 1 is provided with a lighting device 100 that is used to light the discharge lamp 9 (see FIG. 1). The lighting device 100 includes a power circuit unit to be described below, a plurality of welding terminals, a plurality of harnesses, and a terminal housing.

A power circuit unit 23 is provided on the back cover 14. DC power is supplied to the power circuit unit 23 from a DC power source (battery) (not shown).

Since the power circuit unit 23 is provided on the back cover 14 in the above-mentioned vehicle headlight 1, an exclusive disposition space or an exclusive casing for the power circuit unit 23 is not needed. Accordingly, it possible to use a disposition space effectively. As a result, it is possible to reduce the size of the lighting device 100.

The power circuit unit 23 includes a circuit substrate 24 that is mounted on the front surface of the heat radiating body 16; power terminals 25, 25, and 25 that are partially embedded in the internal structural portion 19; and terminal members 26, 26, . . . (of which only one is shown in FIG. 1) that are partially embedded in the internal structural portion 19.

Multiple predetermined electronic components 24a, 24a, . . . are mounted on the circuit substrate 24.

Portions of the power terminals 25, 25, and 25 except for upper end portions 25a, 25a, and 25a and lower end portions 25b, 25b, and 25b of the power terminals are embedded in the internal structural portion 19. Further, the lower end portions 25b, 25b, and 25b of the power terminals 25, 25, and 25 are disposed in the disposition recesses 22, 22, and 22, respectively. Further, the upper end portions 25a, 25a, and 25a of the power terminals 25, 25, and 25 are disposed in the disposition hole 19a. In this embodiment, it is preferable that each of the power terminals 25, 25, and 25 be formed of a plate-like metal material.

A predetermined circuit pattern (not shown) is formed on the circuit substrate 24. The circuit pattern is connected to the upper end portions 25a, 25a, and 25a of the power terminals 25, 25, and 25 and the terminal members 26, 26, . . . for example, by wire bonding or metal ribbons.

A shield plate 27 is mounted on the front side of the back cover 14 (see FIGS. 1 and 2). The shield plate 27 is mounted at a position where the shield plate covers a portion of the internal structural portion 19 of the back cover 14 other than at least the mounting recess 20. In this embodiment, it is preferable that the shield plate 27 be made of a metal material.

The power terminals 25, 25, and 25 of the power circuit unit 23 are connected to the starter, which is disposed in the socket 12 of the discharge lamp 9, through the welding terminals 28, 28, and 28 and the harnesses 29, 29, and 29, respectively.

Figure 4:
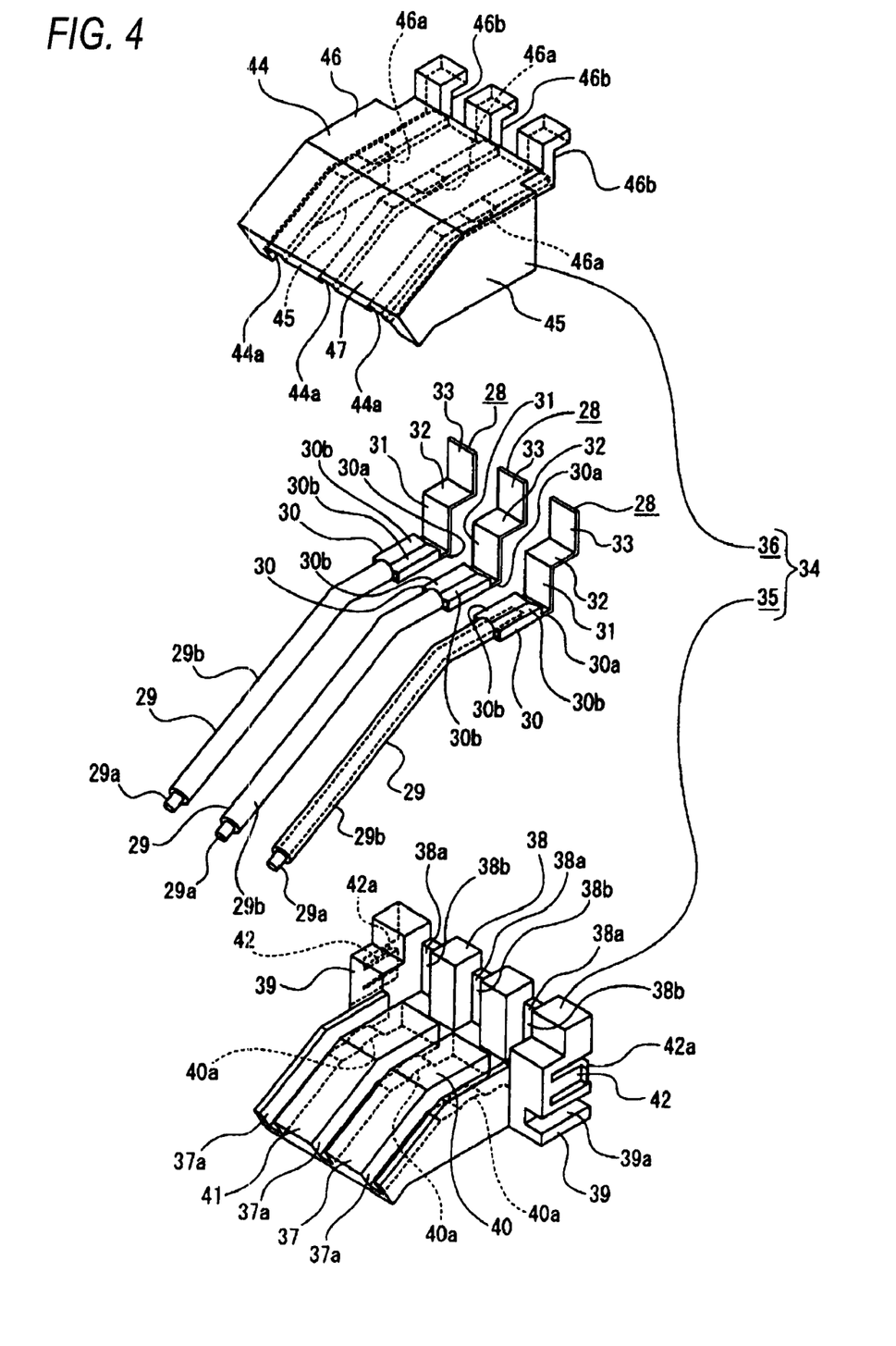
FIG. 4 is an enlarged exploded perspective view showing the terminal housing, welding terminals and harnesses.

The welding terminal 28 includes a first end portion 30, a first intermediate portion 31, a second intermediate portion 32, and a second end portion 33 that are continued to each other while bent in this order by an angle of 90° as shown in FIG. 4. The first end portion 30 and the second intermediate portion 32 are formed so as to face an up-down direction, and the first intermediate portion 31 and the second end portion 33 are formed so as to face the front-rear direction.

The first end portion 30 includes a receiving surface portion 30a and caulking surface portions 30b and 30b. The caulking surface portions 30b and 30b are plate-like members that extend from left and right portions of the receiving surface portion 30a, and are bent toward the inside (toward the receiving surface portion 30a).

The harness 29 includes an electric wire 29a and a coating portion 29b that coats a portion of the electric wire 29a except for both end portions of the electric wire. One end portion of the electric wire 29a is pressed against the receiving surface portion 30a of the first end portion 30 by being pushed by the caulking surface portions 30b and 30b of the first end portion 30. Accordingly, one end portion of the electric wire 29a is connected to the first end portion 30 of the welding terminal 28. Further, the other end portion of the electric wire 29a is connected to the starter that is disposed in the socket 12.

Figure 5:
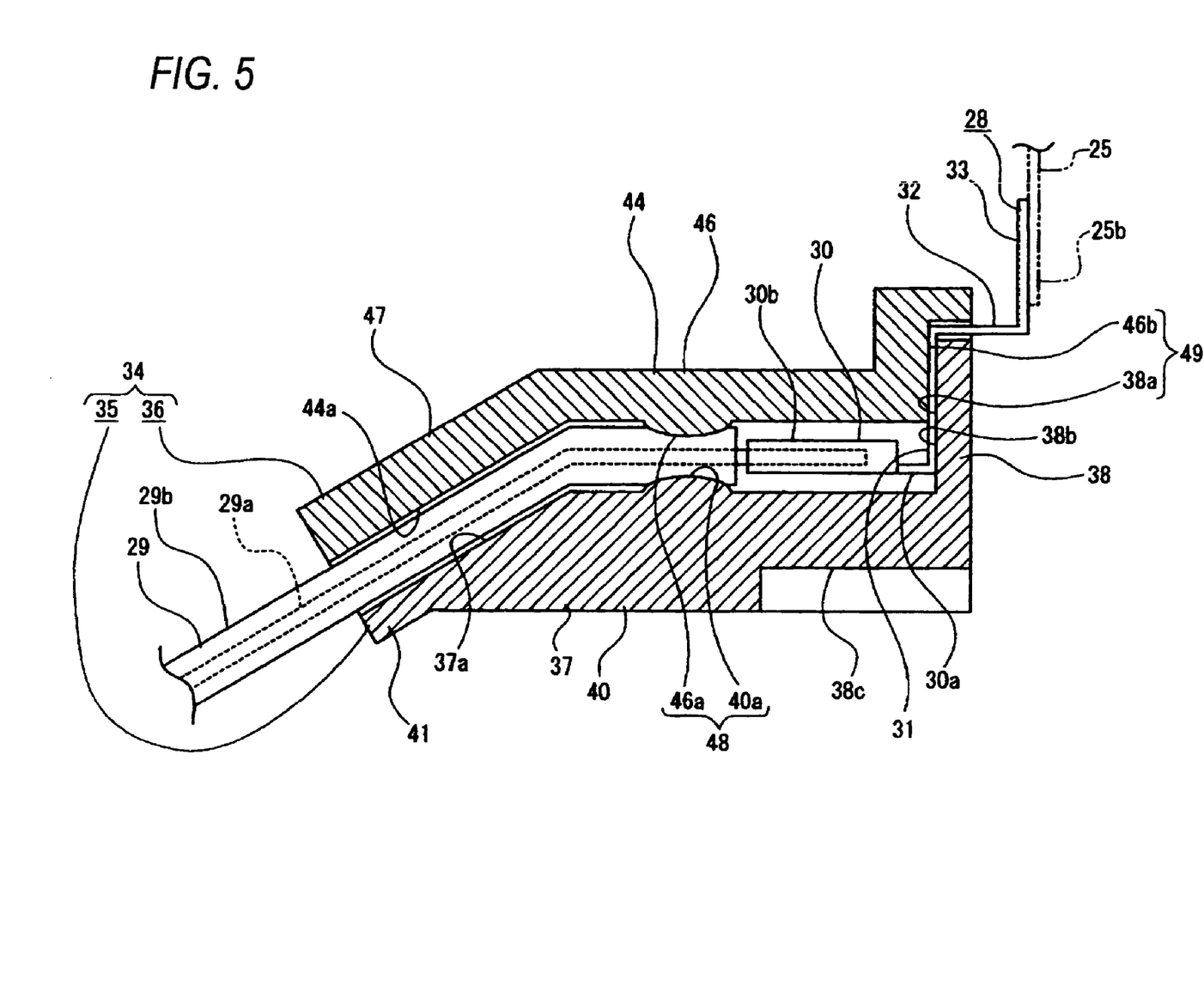
FIG. 5 is an enlarged sectional view showing the welding terminals and harnesses held in the terminal housing.

The welding terminals 28, 28, and 28 and the harnesses 29, 29, and 29 are held in the terminal housing 34 (see FIGS. 3 to 5).

The terminal housing 34 includes a base body 35 and a cover body 36 that is fixed to the base body 35. In this embodiment, it is preferable that the terminal housing 34 be made of a resin material.

As shown in FIGS. 4 and 5, the base body 35 includes a holding portion 37, a holding protrusion 38 that protrudes upward from the holding protrusion 38 of the holding portion 37, and side protrusions 39 and 39 that protrude from the holding protrusion 38 and the rear end portion of the holding portion 37 to the left and right sides.

The holding portion 37 includes a horizontal portion 40 that extends in the front-rear direction, and an inclined portion 41 that protrudes obliquely downward from a front end of the horizontal portion 40. The holding portion includes holding grooves 37a, 37a, and 37a that are opened upward. The holding grooves 37a, 37a, and 37a are formed at regular intervals in the left-right direction. The horizontal portion 40 includes pushing protrusions 40a, 40a, and 40a that are formed on the bottoms of the holding grooves 37a, 37a, and 37a so as to protrude upward, respectively.

The holding protrusion 38 includes three holding recesses 38a, 38a, and 38a that are positioned at intervals in the left-right direction. Each of the holding recesses 38a is opened forward and upward. The surface of each of the holding recesses 38a, which faces the front side, is formed as a restricting surface 38b.

Positioning recesses 38c, 38c, and 38c, which are opened downward, are formed on the rear surface of the holding protrusion 38.

Figure 6:
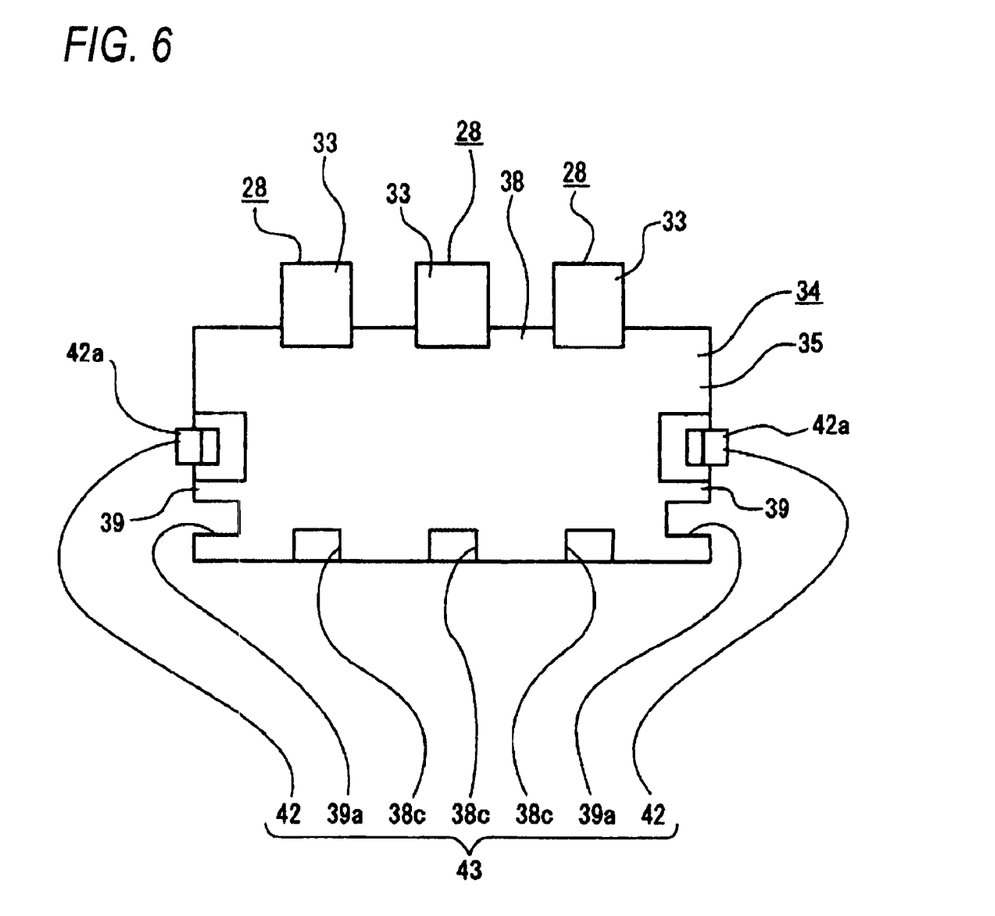
FIG. 6 is a schematic enlarged back view of the terminal housing.

As shown in FIGS. 4 and 6, positioning recesses 39a and 39a, which are opened outward, are formed at the side protrusions 39 and positioning locking portions 42 and 42 are formed at upper portions of the positioning recesses 39a and 39a, respectively. Each of the positioning locking portions 42 includes a locking claw 42a that is formed at the rear end portion of the positioning locking portion so as to protrude outward. Further, the rear end portion of each of the positioning locking portions 42 can be elastically deformed so as to be displaced in the left-right direction.

The positioning recesses 38c, 38c, and 38c of the holding protrusion 38, the positioning recesses 39a and 39a of the side protrusions 39 and 39, and the positioning locking portions 42 and 42 of the side protrusions 39 are engaged with the cover-side positioning portion 21 that is formed at the mounting recess 20 of the back cover 14. Accordingly, the terminal housing 34 is positioned relative to the back cover 14. The positioning recesses 38c, 38c, and 38c, the positioning recesses 39a and 39a, and the positioning locking portions 42 and 42 function as a housing-side positioning portion 43.

As shown in FIGS. 3 to 5, the cover body 36 includes a pushing surface portion 44, and side surface portions 45 and 45 that protrude downward from both left and right side edges of the pushing surface portion 44, respectively.

The pushing surface portion 44 includes a horizontal portion 46 that extends in the front-rear direction, and an inclined portion 47 that protrudes obliquely downward from a front end of the horizontal portion 46.

Holding grooves 44a, 44a, and 44a, which are opened downward, are formed at the pushing surface portion 44 at positions that face the holding grooves 37a, 37a, and 37a formed at the base body 35, respectively. The holding grooves 44a, 44a, and 44a are formed at regular intervals in the left-right direction.

Pushing protrusions 46a, 46a, and 46a, which protrude downward, are formed on the bottoms of the holding grooves 44a, 44a, and 44a of the horizontal portion 46, respectively. The pushing protrusions 46a, 46a, and 46a are formed at positions that face the pushing protrusions 40a, 40a, and 40a formed at the base body 35, respectively.

Restricting surfaces 46b, 46b, and 46b, which face the rear side and are positioned at intervals in the left-right direction, are formed at the rear end portion of the horizontal portion 46.

One end portions of the harnesses 29, 29, and 29 are inserted into the holding grooves 37a, 37a, and 37a of the base body 35, respectively. A part of the respective welding terminals 28, 28, and 28 is disposed on the holding protrusion 38. The first end portion 30 of the welding terminal 28 is positioned so as to face the upper surface of the rear end portion of the holding portion 37, and the first intermediate portion 31 is positioned on the restricting surface 38b.

If the cover body 36 is fixed to the base body 35 from above while the harnesses 29, 29, and 29 and the welding terminals 28, 28, and 28 are disposed in the base body 35 as described above, the cover body and the base body are assembled as the terminal housing 34 (see FIGS. 3 to 5).

While the cover body and the base body are assembled as the terminal housing 34, the holding portion 37 of the base body 35 is covered with the pushing surface portion 44 of the cover body 36 from above and the holding portion 37 is covered with the surface portions 44 and 44 of the cover body 36 from the side (outside). Here, the base body 35 is fixed to the cover body 36 by means such as adhesion.

While the cover body and the base body are assembled as the terminal housing 34, the harnesses 29, 29, and 29 are disposed in the holding grooves 37a, 37a, and 37a of the base body 35 and the holding grooves 44a, 44a, and 44a of the cover body 36 and the coating portions 29b, 29b, and 29b of the harnesses 29, 29, and 29 are clamped by the pushing protrusions 40a, 40a, and 40a of the base body 35 and the pushing protrusions 46a, 46a, and 46a of the cover body 36 (see FIG. 5) in the up-down direction. Accordingly, the harnesses 29, 29, and 29 are held in the terminal housing 34. Therefore, the pushing protrusion 40a of the base body 35 and the pushing protrusion 46a of the cover body 36 function as a harness holding portion 48 that holds the harness 29.

Further, while the cover body and the base body are assembled as the terminal housing 34, the first intermediate portions 31, 31, and 31 of the welding terminals 28, 28, and 28 are clamped by the restricting surfaces 38b, 38b, and 38b of the base body 35 and the restricting surfaces 46b, 46b, and 46b of the cover body 36 in the front-rear direction, so that the welding terminals 28, 28, and 28 are held. Therefore, the restricting surface 38b of the base body 35 and the restricting surface 46b of the cover body 36 function as a terminal holding portion 49 that holds the welding terminal 28 by clamping the welding terminal.

The terminal housing 34, which holds the harnesses 29, 29, and 29 and the welding terminals 28, 28, and 28, is inserted into the mounting recess 20 of the back cover 14 from the front side, so that the welding terminals 28, 28, and 28 are connected to the power circuit unit 23. When the terminal housing 34 is inserted into the mounting recess 20, portions of the welding terminals 28, 28, and 28 protruding from the terminal housing 34 are simultaneously inserted and disposed in the disposition recesses 22, 22, and 22, respectively.

When the terminal housing 34 is inserted into the mounting recess 20, the housing-side positioning portion 43 is positioned by the cover-side positioning portion 21. Accordingly, the terminal housing 34 is disposed at a predetermined position on the back cover 14.

The positioning recesses 38c, 38c, and 38c of the terminal-side positioning portion 43 are positioned at the protrusions 21a, 21a, and 21a of the cover-side positioning portion 21, respectively, and the positioning recesses 39a and 39a of the terminal-side positioning portion 43 are positioned at the second protrusions 21b and 21b of the cover-side positioning portion 21, respectively. Accordingly, the terminal housing 34 is positioned relative to the mounting recess 20 in a direction orthogonal to an insertion direction.

Further, when the terminal housing is inserted into the mounting recess 20, the locking claws 42a and 42a of the positioning locking portions 42 and 42 of the terminal-side positioning portion 43 slide on the left and right side surfaces of the mounting recess 20, respectively, and the positioning locking portions 42 and 42 are elastically deformed. Then, when the locking claws 42a and 42a reach the engaging edges 21c and 21c, respectively, the positioning locking portions 42 and 42 elastically return to their original states. Accordingly, the locking claws 42a and 42a are engaged with the engaging edges 21c and 21c and are positioned, respectively. Therefore, the terminal housing 34 is positioned relative to the mounting recess 20 in the insertion direction.

While the terminal housing 34 is inserted into the mounting recess 20 as described above, the second end portions 33, 33, and 33 of the welding terminals 28, 28, and 28 come into contact with the lower end portions 25b, 25b, and 25b of the power terminals 25, 25, and 25, respectively (see FIG. 5).

While the second end portions 33, 33, and 33 of the welding terminals 28, 28, and 28 come into contact with the lower end portions 25b, 25b, and 25b of the power terminals 25, 25, and 25, respectively, the second end portions 33, 33, and 33 are welded to the lower end portions 25b, 25b, and 25b, respectively, by a welding electrode (not shown).

The welding is not limited to so-called spot welding using the above-mentioned welding electrode. For example, laser welding, which melts and welds a connection portion through the irradiation of a laser beam, can be used as the welding.

An O-ring 50 is fitted on the outer peripheral surface of the mounted portion 17 of the back cover 14 (see FIG. 1). The back cover 14 is mounted on the mounting portion 5 of the lamp body 2, so that the O-ring 50 comes into close contact with the engaging portions 6, 6, . . . of the lamp body 2 and the flange portion 18 of the back cover 14.

While the back cover 14 is mounted on the lamp body 2, portions of the harnesses 29, 29, and 29 protruding from the terminal housing 34 are positioned so as to protrude obliquely forward and downward along the inclined directions of the inclined portions 41 and 47 of the terminal housing 34.

The harnesses 29, 29, and 29 protrude obliquely forward and downward from the terminal housing 34 by being guided by the holding grooves 37a, 37a, and 37a of the base body 35 and the holding grooves 44a, 44a, and 44a of the cover body 36 as described above. Accordingly, it can be possible to prevent the interference between the socket 12 and the harnesses 29, 29, and 29 without the contact between the socket 12 of the discharge lamp 9 and the harnesses 29, 29, and 29.

Meanwhile, the harnesses 29, 29, and 29 are loosely disposed in the lamp chamber 4 so as not to interfere with the swivel operation of the lamp unit 7 in the horizontal direction that is performed by the swivel mechanism of the lamp unit 7.

As described above, in the lighting device 100 according to this embodiment, the harnesses 29, 29, and 29 are connected to the welding terminals 28, 28, and 28 held in the terminal housing 34. Further, the welding terminals 28, 28, and 28 are connected to the power terminals 25, 25, and 25 by welding. Accordingly, since it can be possible simultaneously or continuously to weld the welding terminals 28, 28, and 28 to the power terminals 25, 25, and 25, the workability of a welding piece is improved.

Furthermore, a part of the harnesses 29, 29, and 29 is held by the harness holding portion 48 that is formed at the terminal housing 34. Accordingly, when vibration is generated at the discharge lamp 9 or each component of the lighting device 100, the harnesses 29, 29, and 29 are hardly moved from the welding terminals 28, 28, and 28. As a result, it can be possible to prevent poor connection between the harnesses and the welding terminals.

In addition, since the terminal holding portion 49, which clamps and holds a part of the welding terminals 28, 28, and 28, is formed at the terminal housing 34, it can be possible to secure stable connection between the harnesses 29, 29, and 29 and the welding terminals 28, 28, and 28.

Moreover, the cover-side positioning portion 21 is formed at the back cover 14 and the housing-side positioning portion 43 is formed at the terminal housing 34, so that it can be possible to easily position the terminal housing 34 relative to the back cover 14. Accordingly, the workability of a mounting work for mounting the terminal housing 34 on the back cover 14 is improved.

Meanwhile, the terminal housing 34 is positioned and inserted into the mounting recess 20 of the back cover 14 as described above, so that the welding terminals 28, 28, and 28 are connected to the power terminals 25, 25, and 25, respectively. Accordingly, the displacement of the terminal housing 34 relative to the back cover 14, when vibration or the like is generated, is prevented, so that it can be possible to secure good connection between the welding terminals 28, 28, and 28 and the power terminals 25, 25, and 25.

An example where three power terminals 25, three welding terminals 28, and three harnesses 29 are provided has been described above. However, the number of each of the power terminals 25, the welding terminals 28, and the harnesses 29 is not limited to three. As long as the numbers of the power terminals, the welding terminals, and the harnesses are greater than one and the same as each other, the numbers of the power terminals, the welding terminals, and the harnesses may be arbitrary.

The shapes and structures of the respective component described in the above-mentioned preferred embodiment are merely examples for the embodiment of the invention, and the scope of the invention should not be limited in this way Accordingly, other implementations are within the scope of the claims.

DESCRIPTION OF REFERENCE NUMERALS AND SIGNS

1: vehicle headlight
2: lamp body
3: front cover
5: mounting portion
5a: mounting opening
9: discharge lamp
12: socket
14: back cover
15: main body
16: heat radiating body
17: mounted portion
17a: engaging protrusion
18: flange portion
19: internal structural portion
19a: disposition hole
20: mounting recess
21: cover-side positioning portion
21a: first protrusion
21b: second protrusion
21c: engaging edge
22: disposition recess
23: power circuit unit
24: circuit substrate
24a: electronic component
25: power terminal
25a: upper end portion
25b: lower end portion
26: terminal member
27: shield plate
28: welding terminal
29: harness
29a: electric wire
29b: coating portion
30: first end portion
30a: receiving surface portion
30b: caulking surface portion
31: first intermediate portion
32: second intermediate portion
33: second end portion
34: terminal housing
35: base body
36: cover body
37: holding portion
37a: holding groove
38: holding protrusion
38a: holding recess
38b: restricting surface
38c: positioning recess
39: side protrusion
39a: positioning recess
40: horizontal portion
40a: pushing protrusion
41: inclined portion
42: positioning locking portion
42a: locking claw
43: housing-side positioning portion
44: pushing surface portion
44a: holding groove
46: horizontal portion
46a: pushing protrusion
46b: restricting surface
47: inclined portion
48: harness holding portion
49: terminal holding portion
100: lighting device

What is claimed is:

1. A lighting device comprising a power circuit unit and a plurality of harnesses, the power circuit unit including a plurality of power terminals arranged to be supplied with power from a power source, and the plurality of harnesses including electric wires through which power supplied to the power circuit unit is supplied to a discharge lamp and nonconductive coating portions that cover portions of the electric wires other than both ends of the electric wires, the lighting device comprising:

a terminal housing that is made of a resin material, and includes a harness holding portion, one ends of the plurality of harnesses being disposed in the harness holding portion and a part of the plurality of harnesses being held in the harness holding portion; and a plurality of welding terminals that includes portions disposed in the terminal housing and portions protruding outward from the terminal housing, wherein one end portions of the plurality of welding terminals are connected to one end portions of the electric wires of the harnesses, respectively, and other end portions of the plurality of welding terminals are welded to the power terminals of the power circuit unit, respectively.

2. The lighting device according to claim 1,
wherein the terminal housing includes a horizontal portion that holds the plurality of harnesses so that the plurality of harnesses extends in a horizontal direction, and an inclined portion that holds the plurality of harnesses so that the plurality of harnesses is inclined with respect to the horizontal direction,
the inclined portion is disposed closer to the discharge lamp than the horizontal portion, and
the plurality of harnesses protrudes obliquely downward from the inclined portion.

3. The lighting device according to claim 1,
wherein the terminal housing includes a terminal holding portion that is positioned between the harness holding portion and the other end portions of the welding terminals and clamps and holds the welding terminals.

4. The lighting device according to claim 1,
wherein the power circuit unit is provided on a back cover of a vehicle headlight, and the vehicle headlight includes a lamp body including a mounting portion that includes a mounting opening at a rear end portion thereof, a front cover that covers a front surface of the lamp body, and the back cover that is mounted on the mounting portion of the lamp body.

5. The lighting device according to claim 4,
wherein a mounting recess where the terminal housing is inserted and mounted is formed at the back cover,
a cover-side positioning portion is formed at an opening edge of the mounting recess of the back cover, and
a housing-side positioning portion, which is positioned at the cover-side positioning portion, is formed at an outer peripheral portion of the terminal housing.

* * * * *